United States Patent [19]
Sheeter

[11] Patent Number: 5,201,910
[45] Date of Patent: Apr. 13, 1993

[54] APPARATUS FOR HANDLING TREE SEEDLINGS

[76] Inventor: Eric Sheeter, C.22 Beaver Point Road, R.R.1, Fulford Harbour, B.C., Canada, V0S 1C0

[21] Appl. No.: 776,238
[22] PCT Filed: Mar. 12, 1990
[86] PCT No.: PCT/GB90/00368
§ 371 Date: Nov. 8, 1991
§ 102(e) Date: Nov. 8, 1991
[87] PCT Pub. No.: WO90/10373
PCT Pub. Date: Sep. 20, 1990

[30] Foreign Application Priority Data
Mar. 10, 1989 [GB] United Kingdom ............... 8905469

[51] Int. Cl.⁵ .................................................. B65G 1/00
[52] U.S. Cl. ................................ 198/347.3; 198/626.6; 111/104; 171/61
[58] Field of Search .............. 198/347.3, 626.6; 271/163, 216; 111/104, 105; 171/61

[56] References Cited
U.S. PATENT DOCUMENTS

| | | | |
|---|---|---|---|
| 1,522,702 | 1/1925 | Rosevear | 111/109 X |
| 1,750,054 | 3/1930 | Rosso | 111/105 X |
| 1,996,686 | 4/1935 | Poll | 111/111 |
| 2,297,295 | 9/1942 | Flintjer | 198/626.6 |
| 2,980,041 | 4/1961 | Nielsen | 111/105 X |
| 3,143,269 | 8/1964 | Van Eldik | 198/626.6 X |
| 3,719,158 | 3/1973 | Roths | 111/105 |
| 4,253,411 | 3/1981 | Shulznenko et al. | 111/105 |
| 4,475,643 | 10/1984 | Klingenberg | 198/347.3 |
| 4,570,785 | 2/1986 | Lewanski et al. | 198/626.6 |

FOREIGN PATENT DOCUMENTS 0218537 2/1985 Fed. Rep. of Germany ...... 111/105

Primary Examiner—Robert P. Olszewski
Assistant Examiner—Cheryl L. Gastineau
Attorney, Agent, or Firm—Ostrolenk, Faber, Gerb & Soffen

[57] ABSTRACT

A plant seedling handling apparatus is described which comprises a pair of parallel belts, each of which carries a series of grippers. During loading of the storage device each belt is fed from separate storage means via guide spools which create a nip between the belts. At the nip a pair of grippers 31, 34 grip a seedling stem 36. When the movement is reversed the seedling is released as the grippers separate as the belts pass around the guide spools 24 and 25. The seedling can be released direct to a planting device.

12 Claims, 4 Drawing Sheets

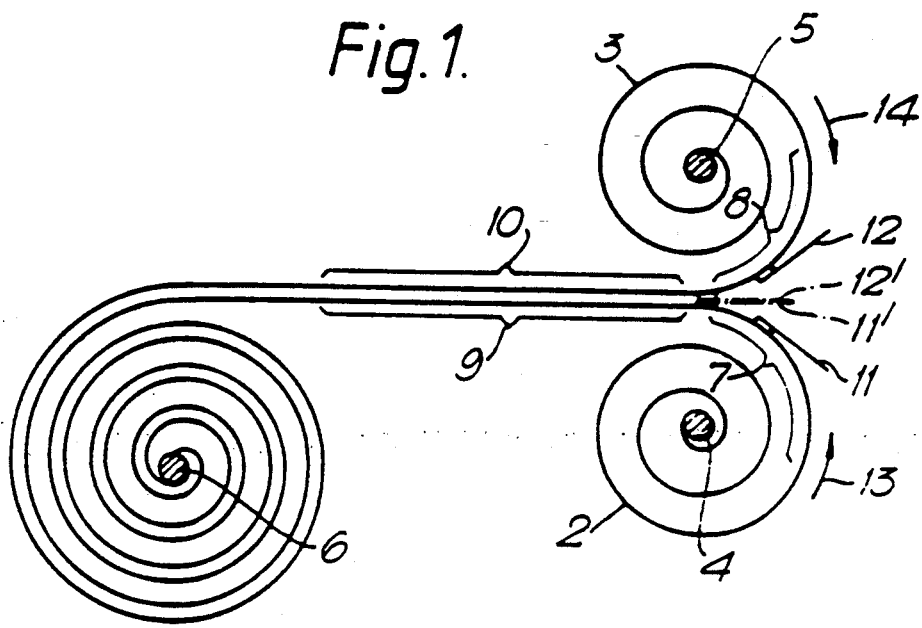
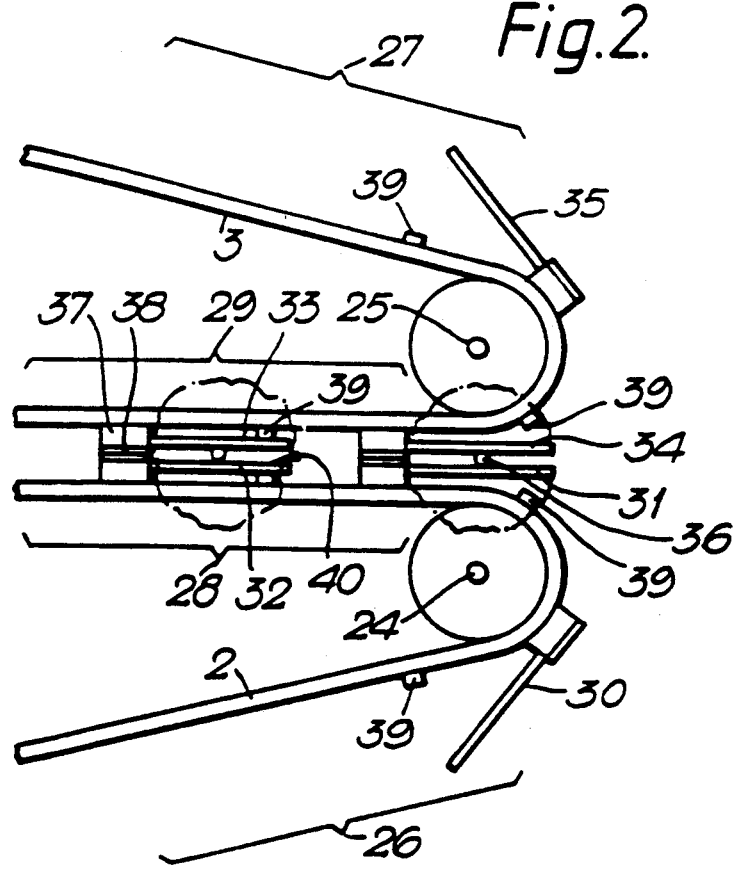

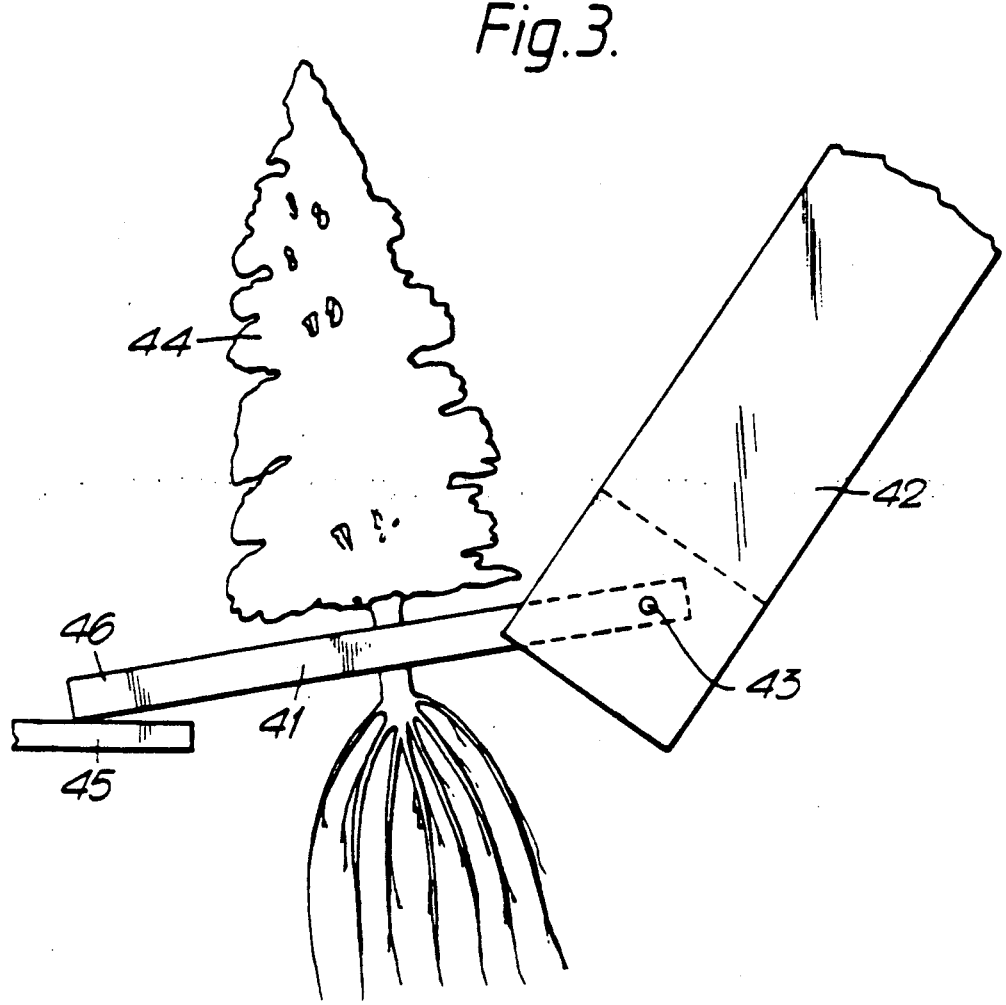
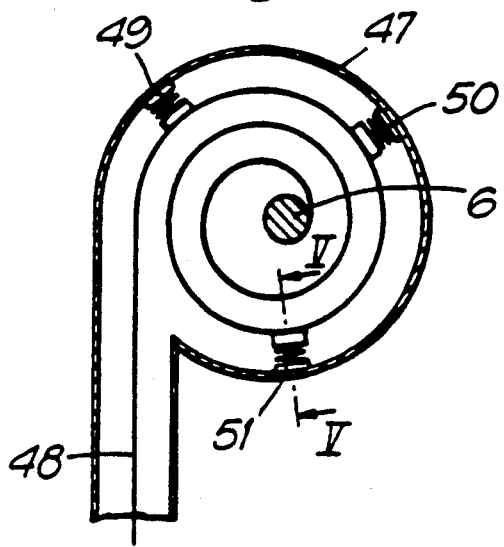
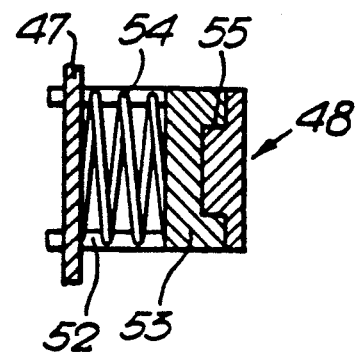

APPARATUS FOR HANDLING TREE SEEDLINGS

The present invention relates to apparatus capable of handling awkwardly shaped delicate or non-rigid objects, in particular for handling tree seedlings both bare root seedlings and packaged root seedlings. The apparatus is particularly suitable for use as part of a machine for the automatic planting of seedlings.

Systems for planting seedlings, having various degrees of automation are known. These reduce the necessary manpower and can increase the rate of planting of the seedlings and also the quality of planting. In order to facilitate various stages in the handling of seedling trees before out planting and in order also to increase their chances of survival after they have been transplanted, various ways of packing the tree roots have been developed. These are of two general types. The first type are transplants which are derived from bare root seedlings by packaging and the second type are grown as such.

A commonly used packaged type derived from bare root stock is the "mud-pack". Mud packs have the general appearance of packaged trees which are grown as such.

There are other ways of packaging bare-root trees. An example is the experimental method known as the BRIKA process in which the roots are enclosed in pressed peat sheets by sandwiching the roots of a seedling between a pair of such sheets, either using a paste to secure the sheets together or by enclosing the whole in a layer of perforated plastic foil.

Packaged root seedlings can be easier to handle since they are more regularly shaped than bare-root trees, but there is still a difficulty in mechanising the planting of packaged root seedlings arising from the variety of packaged root sizes and types. Machinery designed to handle one type of packaged root seedling is often incapable of handling any other type.

Automatic handling devices for packaged root trees have been developed, for instance for feeding seedlings separately from a store carried on a vehicle and planting them in desired locations. Most of the feed mechanisms involve gravity feed from a hopper or pneumatic transporting means. Sometimes the feed mechanism is loaded by hand. Usually the apparatus can handle package root seedlings of one type only. The tree seedlings are usually dropped or blown into the excavation which gives an unsatisfactorily low percentage of properly placed seedlings.

In the United States of America the vast majority of seedling trees planted in forests are bare-root trees (in the region of 66%). This number forms a large proportion of the seedlings planted in North America. Until now the outplanting of such seedlings has been automated only to a limited extent. In one partially automated device, a plough forms a furrow and then trees are individually placed into the furrow, the furrow afterwards being closed by a pair of blades. The tree is fed into the furrow by a pair of discs, each being angled slightly to the vertical so that they are close to each other at their lower regions and spaced apart at their upper regions. The discs are in contact with the ground and roll unpowered as the tractor which carries them moves along. Each tree is placed individually by hand between the discs which rotate the tree down into the furrow and release it near to the bottom as the discs cease to make contact.

In another system for handling bare-root trees, a rotating disc carries a resilient prong which can be pressed against the disc. A plate provided close to the vertical disc over a part of its surface presses the prong towards the plate as the plate rotates. Seedlings are individually hand fed to be gripped by the prong as it is pressed against the disc by the plate. As the disc rotates the seedling is moved down into a furrow and as the seedling reaches the furrow, the prong is released from the plate and the closing of the furrow around the roots of the tree pulls it clear of the opened prong.

In U.S. Pat. No. 3,719,158 there is described a transplanting machine which is apparently capable of handling bare root seedlings and of planting them into a furrow. In the apparatus seedlings are loaded onto, carried and discharged from a magazine which is formed of a single flexible belt material carrying a resilient strip which has spaced cavities or pockets which open as the opposite side of the belt passes around a roll. Seedlings are released from a cavity via a holding belt into a transplanter which comprises a pair of belts between which the seedling is held and which transfers the seedling downwards into a furrow. One problem with the system disclosed is that the orientation of the seedling when held within a gripper on a belt cannot be changed so that the seedling has to be released, transferred to a separate transplanter head which changes the orientation as required.

In U.S. Pat. No. 1,522,702 sugar-beet seedlings are held between adjacent coils in a rolled belt. They are released from the rolled belt by being dropped as the roll is unwound. Each seedling is picked up by one of a number of forked grippers on a transporting belt. The gripper has a cross-bar on its outer prong which allows that prong to be raised as the bar moves over a cam to open the gripper. The cam then allows the gripper to shut the grasped seedling. The belt is then twisted about its axis between the loading zone and the depositing zone so that the seedling is transferred into a vertical orientation. The plant is released by provision of a further cam which bears upon the cross-bar and opens the gripper and allows the seedling to drop into the furrow. One problem with this apparatus is that the seedling can only be dropped into a furrow. Another problem is that although a degree of re-orientation of the seedling is possible this can only be done whilst the seedling moves in a substantially horizontal plane near to the ground, which restricts the design of the vehicle.

In U.S. Pat. No. 4,253,411 a coiled cassette for carrying seedlings is described. Seedlings are held in cells formed between adjacent coils of the cassette by rigid spacers. The seedlings are released from the cassette as the band passes a roller which bends it to increase the space between the spacers or partitions. It is not clear how the seedlings are gripped in the cassette. When released the seedlings must be transferred into the furrow by a separate planting unit which consists of a pair of converging disks. These disks transfer the seedling from a vertical, upside-down orientation through 180° to the vertical orientation ready for planting. A problem with this apparatus is that transfer from the belt mechanism to a separate device is required in order to move the seedling downwards into planting position in the correct orientation.

In FR-A-1266234 a magazine for carrying seedlings is described which comprises a single belt carrying a series of grippers which each consist of a resilient plate fixed at its centre to the belt. The fixture and positions of the grippers are such that adjacent sides of neighbouring gripper plates together hold the stem of a seedling against the belt. The belt passes around a roller which causes the grippers to open and release the seedling. The seedling is from there transferred via a pair of converging rollers or a rotor arranged about a horizontal axis and having a number of arms each with a gripper forming the planting unit. The planting unit thus moves the seedling downwards and changes its orientation. The apparatus does not allow the orientation of the seedling to be changed whilst it is held by the grippers on the belt.

A further difficulty with all of the planters based on a single belt carrying grippers is that the gripper will either be unable to open sufficiently wide to accommodate a range of seedling sizes or the apparatus must be provided with separate opening mechanism which actuates the opening of the gripper.

In some parts of North America furrow planting is being performed on logged ground. The tool is pulled by a heavy bulldozer (e.g. CAT D8) which performs heavy clearing. One of the objects of the present invention is to avoid the necessity for this clearing and thus cut down the cost of planting.

There is common use of both bare-root and packaged seedlings with the proportions of each type varying from region to region. Very large number of both packaged seedling and bare-root seedlings are grown. There is a need to cater for this variety.

It would be desirable for apparatus to be sufficiently flexible to be able to handle both bare-root trees and packaged root trees of the various commonly available types, without the requirement for further preparation or repacking of the seedlings. It would also be desirable for apparatus to be able to feed seedlings direct and automatically from a store to the ground for planting.

New apparatus according to the present invention for handling objects comprises first and second belts each having a working face and together defining a nip between the working faces, and means defining first and second path section for the first and second belts, respectively, which are directed into the nip, and means defining a third path section for both of the belts with their working faces in face to face relationship, and the apparatus comprises also a plurality of grippers arranged in longitudinal sequence on each of the working faces paired so that a gripper on one belt presses against the gripper on the other belt and being resiliently biased towards the opposed gripper so that an object can be gripped between a pair of opposing grippers.

In the apparatus the belts are capable of being driven such that both belts move through the third path section in the same direction at the same rate. That direction is usually such that the belts move from their first and second (respective) path sections to the third path section and is such that objects can be picked up by the belts in the nip and carried by the belts along the third path section. Such objects may be released by continuing the movement of the belts through the third path section towards a second nip between the belts where the objects are released. Alternatively or additionally the belts may be capable of being driven in the reverse direction so that objects are released as they reach the first nip.

The apparatus may be hand loaded with objects, that is objects may be placed by hand in the vicinity of the nip so that a gripper grabs the object as the belts pass through. Alternatively the objects may be loaded by some other conveying device to the nip to be grabbed. One advantageous feature of the present invention is that is is sufficiently flexible that it can be adapted for hand or machine loading. The objects may be released to be grabbed by an operative or by another set of mechanical grippers of another device or may be held in or released into any other desired location for instance, a tree may be held in or delivered into an excavation in the ground during a planting operation.

The nip is generally created by first and second spool means around which the first and second belts pass (respectively). The spools may be for changing the orientation of the belt or may additionally be suitable for winding the belts for their storage.

Each gripper is generally designed so a part of it stands away from the belt as it passes around the spool means preferably so that it "reaches" beyond the nip. As well as allowing the gripper to pick up or drop objects at a distance from the nip this allows objects to be released at a position beyond the nip without movement relative to the nip since the gripper at that point opens and moves outwardly away from the object.

Preferred grippers comprise blades, fixed to the belts with their planes generally parallel to the belt planes. The blades are suitably connected to the belts adjacent one of the blade ends, being the end which is upstream (with respect to the apparatus when the belts are moving in a direction for taking hold of objects). The blades are attached to the belts so that their free ends are resilient and can be pushed towards the respective belt by an object positioned between a pair of grippers. Resilience may alternatively be provided by a soft elastic layer on the facing surfaces of the grippers. To avoid damage to a delicate object between the grippers the object-contacting surfaces may be rendered compliant by being provided with a compliant covering. The blades may be fixed with their longitudinal axes aligned with the belts, although for some uses it may be more convenient to fix the grippers at an angle to the belt. The blades may be straight or may be L-shaped or other shapes. They may be fixed towards an edge of the bands or, preferably, may be fixed substantially centrally. The length of the blades is determined by the distance beyond the nip it is required for the gripper to reach and if appropriate, by the width of the belt and the position of the pivot fixing on the belt when rotation of the blades is necessary.

It is sometimes convenient to attach gripper blades via pivots which allow the blades to pivot about an axis which is substantially perpendicular to the plane of the belt. Such grippers can be pivoted whilst gripping an object, for instance to reorient it before its release. Such pivoting may be carried out by camming of the blades on a blade stop as the belt is moved. An alternative mechanism for pivoting the blades is to affix a spring to each blade which biases the blades towards a position at which the seedling would be in the planting orientation (i.e. in which the blade is at an angle to the direction of movement of the belt). In this case the belt is provided with a restrainer which retains the blades against the spring bias in the orientation for transport and storage of the seedlings, (i.e. in which the longitudinal axis of the blade is parallel with the direction of movement of the belt). As the grippers reach the nip and open they are released from the restrainer so that they rotate to re-orient the seedling.

A gripper on a belt may comprise an array of blades, which can be arranged for optimal handling of particularly awkwardly shaped objects. For instance where the object to be handled is a tree seedling, it may be suitable for the crown and the stem to be gripped, and two pairs of blades may be provided for such gripping.

The belts may be flexible only in the plane which is perpendicular to the plane of the belt, that is it may be incapable of twisting and be formed of rigid links which are mutually rotatable about axes lying in the plane of the belt perpendicular to the belt's longitudinal axis, similar to a bicycle chain. The grippers of such belts are desirably rotatable in order to allow for flexibility in the orientation of an object so that its orientation may be changed before it is released by the gripper. Alternatively the belt may be twistable about its longitudinal axes or may have a joint structure such that it can be flexed in directions other than that in which the bicycle chain described above can be flexed or may have some elasticity so that the belt may be directable so that an object gripped in a gripper can have its orientation and direction of movement changed by bending the belt in a particular direction. For instance an object in a horizontal orientation that is moving downwards may become vertically oriented and be moved in a horizontal direction. Belts which are twistable about their longitudinal axis can be directed around rollers whose axes are angled to each other which can allow reorientation of the object followed immediately by its release. Providing the rollers with the facility of their axes to rotate to separate the nip-forming portions, can provide even more controlled release of the object.

The belts may comprise flat bands of continuous material, optionally provided with transverse or longitudinal strengthening means which can also affect the degree and type of flexibility, as described above. Alternatively the belts may comprise a band of circular or other solid section or may comprise a plurality of links connected by joints to give the desired flexibility.

In the type of apparatus in which objects are released by reversal of the belts movements, the apparatus is preferably provided with a storage device for the belt pair, for instance carrying a plurality of objects between the belts, in a corresponding plurality of grippers. Usually the storage system comprises a spool on which the pair of belts is wound. An alternative storage system is a box into which the pair of belts may be folded.

Generally the belts have connector means, so that they are maintained in the desired orientation with respect to one another especially in the third path section and any storage system. For instance the grippers may be provided with connecting means so that paired grippers remain in contact with each other. Such connecting means may comprise Velcro, paired magnets, permanently tacky pressure sensitive adhesive, button studs or snap fasteners. Where the apparatus comprises storage means for laden belt pairs, for instance which comprises a spool on which the belts are wound, there may be means for connecting adjacent windings of the belt pair. Alternatively or additionally the storage means may be provided with a guide system, for instance attached to a store housing or to a spool which supports the belts and/or the objects held by the belts. The belts may be sufficiently wide that their edges extend beyond the objects being held, in which case they may be supported on conventional spool guides such as used for reels of film. If the belts are narrower they may be provided with extensions which reach beyond the objects, which can be supported on spool guides.

Usually the apparatus is part of or can be fixed to machinery which has drive means for moving the belts along their respective paths. The drive means will be capable of moving the belts such that they are moving in the same direction along their respective second belt path sections. For taking hold of objects this direction is such that the belt moves from the first to the second belt path section. Preferably the machine comprises drive means for moving the belts in the opposite direction, so that objects held between the belts may be released. In a preferred machine in which the apparatus comprises storage spools for laden paired belts and for each individual belt, the drive means are for rotating those spools.

The invention is further illustrated in the accompanying drawings in which:

FIG. 1 is a diagrammatic plan view of one embodiment of the apparatus according to the invention;

FIG. 2 is a plan view in close up of a part of another embodiment of the apparatus of the invention;

FIG. 3 is a side view of part of a planting device comprising apparatus according to the invention;

FIG. 4 is a plan view of the storage part for a laden pair of belts;

FIG. 5 is a cross-section along line v—v in FIG. 4.

Figure 6:
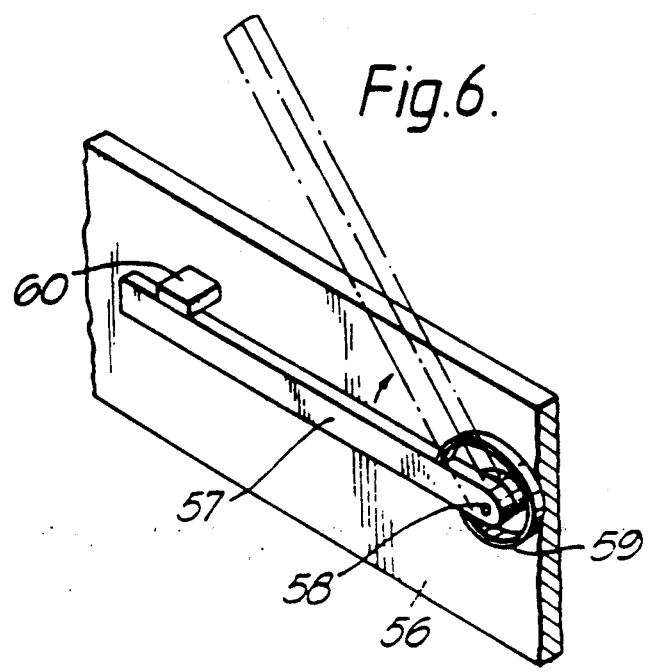
FIG. 6 is a perspective view of one belt carrying one of a pair of gripper blades.

As shown in FIG. 1 an apparatus according the invention comprises belts 2 and 3, which follow respective belt paths from feed spools 4 and 5 to a common storage spool 6. The belt paths consist of respective first belt path sections, 7 and 8, and second belt path sections 9 and 10. In the second belt path sections the two belt paths are substantially parallel with one another and the belts are supported in face to face relationship in this section. In the first belt path sections 7, 8, the belt paths approach each other.

Each belt carries a plurality of gripper blades, of which one is shown on each belt in the diagram as 11 and 12. These are attached via their upstream ends to the belt by means more clearly illustrated and described below in relation to FIG. 2. For handling tree seedlings the blades are conveniently between 3 and 10 cm, preferably around 5 cm long. As the belts move in the directions indicated by arrows 13 and 14, the blades move to the positions illustrated by the broken lines 11' and 12'. The movement of the belts is caused by the driven rotation of spool 6.

FIG. 2 shows in more detail how the apparatus of the invention works. Belts 2 and 3, each of which is fed from a feed spool not shown in the diagram, are led around respective guide spools 24 and 25. These change the orientation of the belt from the first belt paths, respectively 26 and 27, to the second belt path sections, respectively 28 and 29. A plurality of gripper blades, 30 to 35, are provided on the belts. The blades are positioned such that they meet in pairs in the second belt path sections 28 and 29. When movement of the belts 22 and 23 is driven by rotation of a storage spool (not shown in this diagram) the belts move in so that a pair of blades 30, 35, initially held apart, are brought together and can pick up and grip an object located between them, such as a tree stem 36 which is shown held between the gripper blades 31 and 34. In this embodiment the blades are held by a connector 37, to which is attached a spacer 38, which in the second path section serves to keep the blades from being in direct contact with one another. There are also provided supports 39, to keep the blades from touching the belt. In this embodiment the support 39 is attached to the belt but it could alternatively be attached to the back of the blade. The contact surfaces of the blade 40 may be provided with a compliant covering in order to prevent damage of an object gripped by it.

FIG. 3 shows means by which the orientation of an object, in this instance a seedling tree, may be altered before it is released. A blade 41 is attached to a belt 42 via a pivot 43. There is a corresponding blade paired with blade 41 and attached to the other belt by a similar pivotable connection, not shown in the diagram. A bare-root tree seedling 44 is held between the blades. The apparatus comprises an end stop 45 which is positioned such that as the laden pair of gripper blades move forward towards the area where the tree 44 is to be deposited, the ends 46 of the blades contact the end stop and as they move forward are caused to rotate about the pivot 43. This brings the tree 44 into a vertical orientation before it is deposited by separation of the blades as they are moved apart by movement of the respective belts, in the direction reversed to that shown in FIG. 1.

FIG. 6 shows an alternative device by which the orientation of the seedling can be changed. The figure shows one of a pair of belts 56 which carries a blade 57 attached via a pivot 58 to the belt. A spring 59 is attached to the belt and to the blade and is biased so that, unless restrained, the spring will rotate the blade in the direction of the arrow to the position shown by the dotted lines. During storage the rotation of the blade is prevented by a restrainer 60 attached to the belt. The restrainer may simultaneously act as a connector for stabilising the grippers of a pair. As the pair of belts moves from its parallel section through the nip to open the gripper blades, the restrainer moves away from the blade so that it is rotated by the spring to allow the seedling to be moved into the vertical orientation for planting. The blade is positioned in the restrained position during loading either by hand, by the operator, or by some automatic mechanism.

FIGS. 4 and 5 show the provision of means for stabilising the storage spool of belt pairs. The storage spool 6 is provided within a housing 47 into which are led the pair of belts, for convenience shown as a single belt 48. Attached to the housing are three radially spaced support devices, 49, 50 and 51. These each comprise a housing attachment part 52, slideable radially with respect to the spool) in the housing, and a belt contact head 53. The head 53 is urged inwards into contact with the belts 48 by a spring 54. The head 53 and belt 48 are provided with interlocking profiles 55, so that the belt 48 is prevented from moving vertically with respect to the housing. The springs 54 are intended to be able to urge the head 53 into contact with the belt when the spool 6 is empty or full.

Different stabilising means to those illustrated in FIGS. 4 and 5 could be envisaged. For instance the belt or blade could be provided with vertical guide members which would be sufficiently long to extend beyond any object to be held between the blades, and these could contact normal spool guides for supporting the belt pair in the store. Alternatively or additionally the belts could be stabilised by the provision of cross bars affixed to the storage spool 6 for rotation therewith, and that would contact the bottoms of the objects in the store.

For gripping particularly fragile objects, the grippers on the belts could be provided with protective encasing members, which could surround the object simultaneously with it being gripped by the gripper blades. Such protective casings may in some instances be useful to protect seedling trees from damage. Another means of protecting objects is by the incorporation of a web on either or both sides of the belt, which is wide enough to reach beyond the objects and which is wound or laid down with the belts in the storage part of the device and separates adjacent windings of belt pairs.

Figure 8:
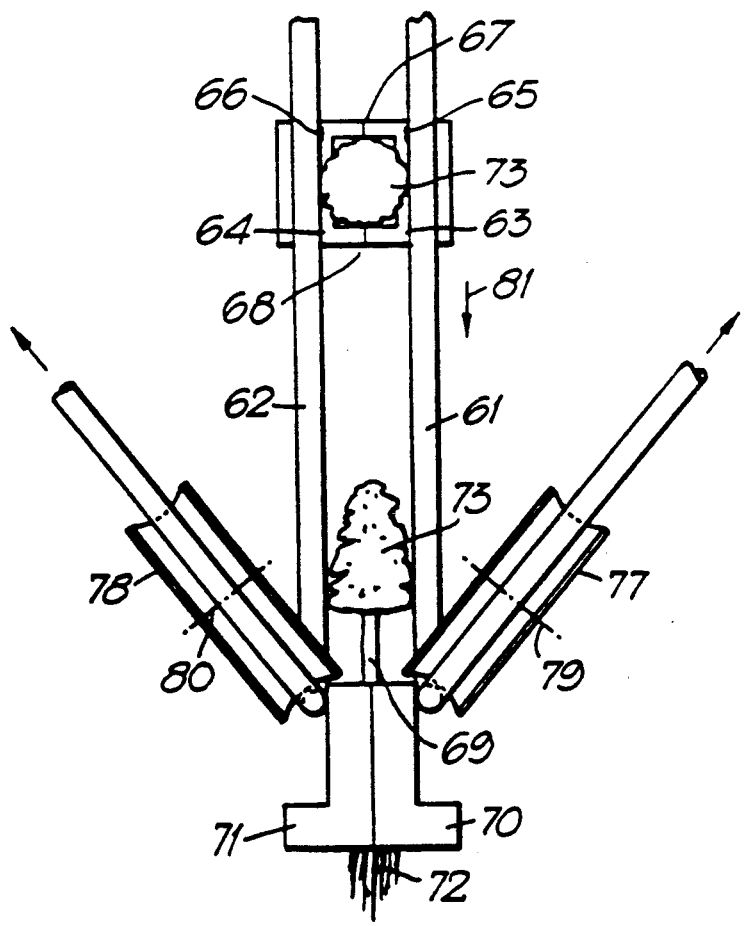
FIG. 8 is a front view of the release section suitable for the embodiment of FIG. 7.
Figure 7:
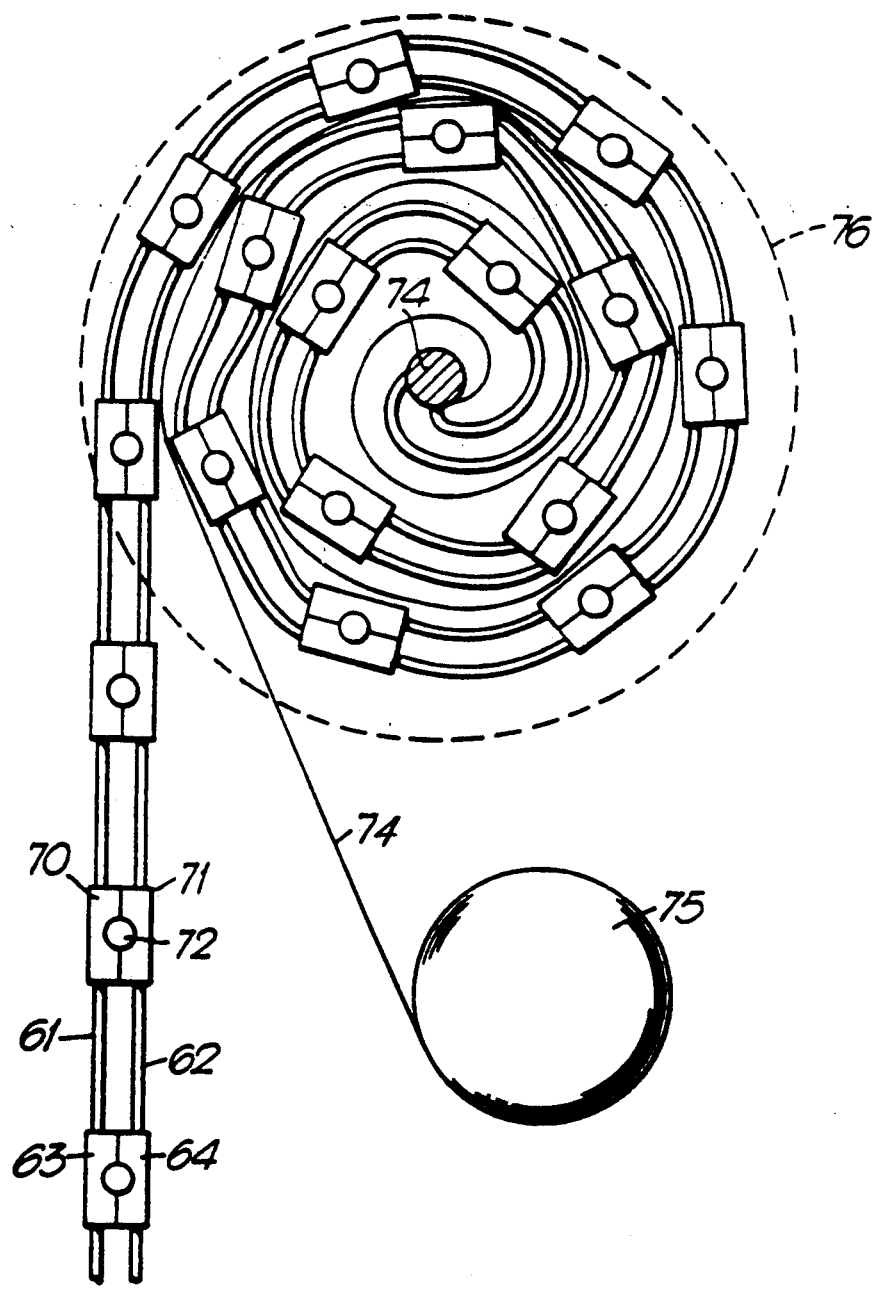
FIG. 7 is a side view of a second embodiment of a storage device for a laden pair of belts.

In FIGS. 7 and 8 there are shown a further embodiment of apparatus according to the invention. In this embodiment the belts 61 and 62 are of approximately circular cross-section. In this instance one each of a pair of grippers 63 and 64 are carried on the belts and are attached via one corner shown at 65 and 66. The grippers in this embodiment have connector means at the upstream 67 and downstream 68 ends. The gripper thereby encloses the stem 69 of a seedling held between them. The grippers also have protruding portions 70, 71, which extend beyond the roots 72 and branches 73 of the seedling. In the storage device shown in FIG. 7 a separate web 74' which extends beyond the top and roots of the seedlings is fed with the belts around the spool 74, so that a layer of web separates adjacent windings of the belt. The web 74' is fed from and stored on a separate spool 75. The web contacts the protruding portions 70, 71 of the grippers which act as spacers to protect the seedlings from damage. The web 74' also serves to stabilise the loaded belts and is generally guided by a spool guide which is attached to the spool 74 and is shown in FIG. 7 by the dotted line 76.

The seedlings are released from this embodiment as shown in FIG. 8, by passing the belts 61, 62 around a pair of rollers 77, 78 which rotate about axes 79, 80 which are angled to the horizontal. As the belts 61, 62 are led, in this instance substantially vertically in the direction shown by arrow 81, the belts pass around rollers 77, 78, respectively, so that the seedling is re-oriented to an upright position. The belts then separate by virtue of the angled axes of the rollers, so that the grippers separate to release the seedling by a similar mechanism to that shown in FIG. 2. The belts are subsequently stored on storage spools, not shown.

For more complex handling apparatus, two or more pairs of belts may be used, each having independent sets of grippers, positioned so that an object may be simultaneously held by grippers in both sets of belt pairs.

The present apparatus is of particular use for handling seedling trees and can be sufficiently flexible that it can handle both bare-root trees and packaged root trees of various types, i.e. it is unspecialised in the type of seedlings it can handle. The apparatus may be used as part of an automated planting system. The apparatus may form a combination of seedling storage and supply to the planting instrument. Thus the trees may be stored whilst supported between grippers in the apparatus. The trees may be fed directly therefrom to a planter or via an intermediary transfer device which can also comprise apparatus according to the present invention with grippers. Another type of intermediary device or may comprise a pair of grippers mounted on a pair of disks or on other means carried on a planting instrument which open and close the grippers on being rotated. These grippers may hold the tree stationary with respect to the planting head. The apparatus may thus be provided with connector means by which it can be affixed to a planting head. The apparatus can avoid successive gripping, ungripping and regripping steps generally required to be performed when removing seedlings from a storage device and conveying them to the planting instrument. It also avoids loose transfer (dropping) of tree seedlings into an excavation and can hold the seedling whilst any excavating and even backfilling takes place. A suitable planting head is described in my co-pending application PCT/GB90/00369 (WO 90/10374) filed even date herewith.

Use of the apparatus as part of an automated outplanting system for seedling trees enables manpower to be reduced and the rate of planting to be increased, even when using bare-root trees. When used in such an automatic out planting machine a plurality of storage devices loaded with seedlings may be carried on the machine and may be sequentially connected to the planting head. The seedlings are fed from the storage device to the planting head by which they are planted out until the device is empty. The empty device can be disconnected before reconnection of the next full device. A planting machine can comprise several such planting heads each connected to a storage device.

In such a device the tree seedlings must initially be held by the apparatus at a position above the ground and must be moved by the apparatus to a position at the ground. The belts and grippers may be arranged for a combination of flexing and rotation such that the trees can be delivered in a vertical orientation into the ground directly from the grippers. Alternatively the device may transfer seedlings to the planting head at a position above the ground, the grippers releasing the seedling to other holding means attached to the planting head. The planting head itself may then transfer the seedling to the ground. Alternatively there may be an intermediary device to which the tree is transferred from the belt grippers and which then conveys the tree down to the planting head.

The apparatus can also be used as part of a root packaging system for converting bare-root tree seedlings to packaged root seedlings. The apparatus could thus include a packing device which packs the roots of the seedlings as the seedling is held by a gripper. The device could be loaded automatically or by hand with bare root seedlings, the seedlings would be conveyed to the packing device and thence to a store e.g. where the seedlings could be further grown or directly or to a planting device. The ability of the device to handle both bare root and packaged seedlings would be utilised in such an apparatus.

The use of the dual belt system with the paired grippers allows release of a seedling without much motion in the direction of movement of the belt. The use of grippers fixed via a pivot towards one end enables the orientation of a seedling prior to release to be achieved. This allows the storage device to be carried at a position well removed from the ground and for the handling mechanism then to transfer the seedlings from the storage device to the planter and to re-orient them before they are planted, all without removal of the seedling from the gripper.

The apparatus can also be used in a variety of operations and machines, where it is desired to pick up and then deposit articles automatically. For instance the apparatus may form part of a variety of robots for various uses. The relative dimensions of the blades, the belts and their distances apart, and of the storage spools and direction-changing rollers, can be varied to suit the desired use.

I claim:

1. Apparatus for handling objects comprising first and second belts (2, 3) each having a working face and together defining a nip between the working faces, and means defining first (26) and second (27) path section for the first and second belts, respectively, which are directed into the nip, characterised by comprising also a third path section (28, 29) for both of the belts with their working faces in face to face relationship, and by comprising a plurality of grippers (30-35) arranged in longitudinal sequence on each of the working faces paired so that a gripper on one belt (31) presses against the gripper (35) on the other belt and being resiliently biased towards the opposing gripper so that an object (36) can be gripped between a pair of opposing grippers, wherein the grippers comprise blades (30-35), fixed to the belts with their planes generally parallel to the belt planes and connected to the belts adjacent the blade end which is more distant from the nip in the third path section.

2. Apparatus according to claim 1 which includes drive means for moving the belts such that they move from their first and second path sections to the third path section.

3. Apparatus according to claim 1 which includes drive means for moving the belts such that they move from the third path section to the first and second path sections.

4. Apparatus according to claim 1 in which the nip is created by first (24) and second (25) spools around which the first and second belts pass, respectively.

5. Apparatus according to claim 1 in which the blades are attached to the belts so that their free ends are resilient and can be pushed towards the respective belt by an object positioned between a pair of grippers.

6. Apparatus according to claim 1 in which the gripper blades are attached via pivots (43, 58) which allow the blades to pivot about an axis which is substantially perpendicular to the plane of the belt.

7. Apparatus according to claim 6 in which the blades (57) are biased by a spring mechanism (59) for pivoting about that axis.

8. Apparatus according to claim 3 which comprises a storage device for the belt pair disposed in the third path section.

9. Apparatus according to claim 1 in which the belts have connector means, so that the working faces are maintained in the desired face to face orientation with respect to one another in the third path section.

10. Apparatus according to claim 7 in which the belts are provided with restraining means (60) for holding the blades to prevent them from being pivoted by the spring mechanism whilst the belts are in the third path section, but not whilst they are in the first and second path sections.

11. Apparatus according to claim 8 in which the storage device is a spool on which the pair of belts is wound.

12. Apparatus according to claim 2 which includes drive means for moving the belts such that they move from the third path section to the first and second path sections and in which the nip is created by first (24) and second (24) spools around which the first and second belts pass, respectively.

* * * * *